US012634678B2

(12) United States Patent
Homorodi et al.

(10) Patent No.: US 12,634,678 B2
(45) Date of Patent: May 19, 2026

(54) PUSHING ESIM FUNCTIONALITY TO USER DEVICES BY CELLULAR NETWORKS

(71) Applicant: T-Mobile USA, Inc., Bellevue, WA (US)

(72) Inventors: Zoltan Homorodi, Bellevue, WA (US); Nilesh Ranjan, Sammamish, WA (US); Savitha Venkata Rao, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 754 days.

(21) Appl. No.: 18/073,392

(22) Filed: Dec. 1, 2022

(65) Prior Publication Data

US 2024/0187841 A1    Jun. 6, 2024

(51) Int. Cl.
  *H04W 8/20*          (2009.01)
  *H04W 8/18*          (2009.01)
(52) U.S. Cl.
  CPC ........... *H04W 8/205* (2013.01); *H04W 8/183* (2013.01)
(58) Field of Classification Search
  CPC .................................................... H04W 8/205
  See application file for complete search history.

(56) References Cited

U.S. PATENT DOCUMENTS

| | | | |
|---|---|---|---|
| 7,155,526 B2 | 12/2006 | Chaudhary et al. | |
| 8,331,384 B2 | 12/2012 | Ghai | |
| 8,345,604 B2 | 1/2013 | Balasubramanian et al. | |

| | | | |
|---|---|---|---|
| 8,559,337 B2 | 10/2013 | Xie et al. | |
| 9,510,376 B2 | 11/2016 | Wang et al. | |
| 9,843,975 B2 | 12/2017 | Roeland et al. | |
| 10,292,040 B2 | 5/2019 | Dubesset et al. | |
| 10,455,536 B1 | 10/2019 | Khawand et al. | |
| 10,477,383 B2 | 11/2019 | Namiranian | |
| 10,536,840 B2 | 1/2020 | Lipovkov | |
| 10,652,728 B1 | 5/2020 | Guday et al. | |
| 10,659,954 B2 | 5/2020 | Hamblet | |
| 10,674,346 B2 | 6/2020 | Faccin et al. | |

(Continued)

FOREIGN PATENT DOCUMENTS

| | | |
|---|---|---|
| CN | 102457834 B | 1/2016 |
| CN | 110312252 A | 10/2019 |

(Continued)

OTHER PUBLICATIONS

European Patent Office, Extended European Search Report, EP Patent Application 21176552.4, mailed Oct. 22, 2021, 6 pages.

*Primary Examiner* — Barry W Taylor
(74) *Attorney, Agent, or Firm* — Perkins Coie LLP

(57)          ABSTRACT

A system identifies devices to be migrated from a first network to a second network. Identifying the devices includes determining that the devices are eSIM-capable of being upgraded to operate using the second network. For each device, an eSIM profile is determined. Each device has a SIM card or a previous eSIM profile installed. The eSIM profile matches a level of service to be provided to the device by the second cellular network. The eSIM profile is pushed to the device. The eSIM profile is downloaded and installed on the device. The system determines that the eSIM profile has been installed on the device. The level of service to be provided to the device is enabled on the eSIM profile. The SIM card or previous eSIM profile on the device is disabled.

20 Claims, 5 Drawing Sheets

(56) References Cited

U.S. PATENT DOCUMENTS

| | | | |
|---|---|---|---|
| 10,708,766 B1 * | 7/2020 | Umamaheswaran ... | H04W 4/60 |
| 10,826,945 B1 | 11/2020 | Xu et al. | |
| 10,827,344 B2 | 11/2020 | Gupta | |
| 10,848,961 B1 | 11/2020 | Larsson et al. | |
| 10,911,945 B1 | 2/2021 | Youngs | |
| 10,939,268 B1 | 3/2021 | Roy et al. | |
| 10,958,618 B2 | 3/2021 | Xu et al. | |
| 10,966,269 B2 | 3/2021 | Keller et al. | |
| 10,984,128 B1 | 4/2021 | Hoffer | |
| 10,993,096 B1 | 4/2021 | Williams et al. | |
| 10,999,888 B2 | 5/2021 | Kang et al. | |
| 11,109,220 B1 | 8/2021 | Shah et al. | |
| 11,223,940 B2 | 1/2022 | Schmidt et al. | |
| 11,362,955 B2 | 6/2022 | Chin et al. | |
| 11,477,701 B2 | 10/2022 | Tsai et al. | |
| 11,889,298 B2 | 1/2024 | Foti et al. | |
| 2006/0072531 A1 | 4/2006 | Ewing et al. | |
| 2009/0007091 A1 | 1/2009 | Appiah et al. | |
| 2012/0108204 A1 | 5/2012 | Schell et al. | |
| 2015/0281964 A1 | 10/2015 | Seo et al. | |
| 2016/0020802 A1 | 1/2016 | Lee et al. | |
| 2016/0020803 A1 | 1/2016 | Cha et al. | |
| 2016/0020804 A1 | 1/2016 | Lee et al. | |
| 2016/0192186 A1 | 6/2016 | Lin | |
| 2016/0352917 A1 | 12/2016 | Pieda et al. | |
| 2017/0033823 A1 | 2/2017 | Smith et al. | |
| 2017/0048713 A1 | 2/2017 | Guday et al. | |
| 2017/0064552 A1 | 3/2017 | Park et al. | |
| 2017/0142121 A1 | 5/2017 | Lee et al. | |
| 2017/0208039 A1 | 7/2017 | Godfrey | |
| 2017/0289788 A1 * | 10/2017 | Lalwaney | H04W 8/24 |
| 2017/0289883 A1 | 10/2017 | Kiss et al. | |
| 2017/0338944 A1 | 11/2017 | Yang et al. | |
| 2017/0338954 A1 | 11/2017 | Yang et al. | |
| 2018/0014339 A1 | 1/2018 | Baek et al. | |
| 2018/0070224 A1 | 3/2018 | Park et al. | |
| 2018/0109676 A1 | 4/2018 | Yeoum et al. | |
| 2018/0146364 A1 | 5/2018 | Coureau et al. | |
| 2018/0167983 A1 | 6/2018 | Salkintzis | |
| 2019/0037335 A1 | 1/2019 | Steck | |
| 2019/0069122 A1 | 2/2019 | Karimli et al. | |
| 2019/0075453 A1 | 3/2019 | Yoon et al. | |
| 2019/0098488 A1 | 3/2019 | Syed et al. | |
| 2019/0140837 A1 | 5/2019 | Cheng et al. | |
| 2019/0230087 A1 | 7/2019 | Gharout et al. | |
| 2019/0289454 A1 | 9/2019 | Inoue | |
| 2019/0324735 A1 | 10/2019 | Park | |
| 2019/0335330 A1 | 10/2019 | Salkintzis | |
| 2019/0364415 A1 | 11/2019 | Gao et al. | |
| 2019/0373448 A1 | 12/2019 | Gao | |
| 2020/0015069 A1 | 1/2020 | Anslot et al. | |
| 2020/0021975 A1 | 1/2020 | Schouler | |
| 2020/0092711 A1 | 3/2020 | Chen et al. | |
| 2020/0134638 A1 | 4/2020 | Beaver | |
| 2020/0137558 A1 | 4/2020 | Chaugule et al. | |
| 2020/0236546 A1 | 7/2020 | Yu et al. | |
| 2020/0280843 A1 | 9/2020 | Foti et al. | |
| 2020/0288300 A1 | 9/2020 | Oswal et al. | |
| 2020/0314638 A1 | 10/2020 | Veneroso | |
| 2021/0037060 A1 | 2/2021 | Robison et al. | |
| 2021/0058748 A1 | 2/2021 | Liao | |
| 2021/0110057 A1 | 4/2021 | Lamba et al. | |
| 2021/0136582 A1 | 5/2021 | Liu | |
| 2021/0306849 A1 | 9/2021 | Liu | |
| 2021/0385192 A1 | 12/2021 | Zhang et al. | |
| 2022/0060880 A1 | 2/2022 | Niemi et al. | |
| 2022/0078872 A1 | 3/2022 | Shrestha et al. | |
| 2022/0086622 A1 | 3/2022 | Laina Farell et al. | |
| 2022/0141652 A1 * | 5/2022 | Shah | H04W 4/70 370/329 |
| 2022/0232366 A1 | 7/2022 | Seo | |
| 2022/0232385 A1 | 7/2022 | Seo | |
| 2022/0232388 A1 | 7/2022 | Seo et al. | |
| 2022/0248361 A1 | 8/2022 | Long | |
| 2022/0329446 A1 | 10/2022 | Jackson et al. | |
| 2022/0345949 A1 | 10/2022 | Youn et al. | |
| 2023/0011447 A1 * | 1/2023 | Gundavelli | H04W 8/205 |
| 2023/0021912 A1 | 1/2023 | Jain et al. | |
| 2023/0413060 A1 | 12/2023 | Baskaran et al. | |
| 2024/0007848 A1 * | 1/2024 | Chaugule | H04W 8/265 |
| 2024/0031811 A1 | 1/2024 | Mohebbi | |
| 2024/0107303 A1 | 3/2024 | Pattnaik | |
| 2025/0097691 A1 * | 3/2025 | Gupta | H04W 12/35 |

FOREIGN PATENT DOCUMENTS

| | | |
|---|---|---|
| CN | 111183670 A | 5/2020 |
| CN | 111328455 A | 6/2020 |
| CN | 106411676 B | 7/2020 |
| CN | 107257539 B | 10/2020 |
| CN | 111758246 A | 10/2020 |
| CN | 112602298 A | 4/2021 |
| CN | 112954629 A | 6/2021 |
| CN | 108810123 B | 9/2021 |
| CN | 113563451 A | 12/2021 |
| CN | 110830996 B | 4/2022 |
| EP | 1938518 A1 | 7/2008 |
| EP | 3170301 A1 | 5/2017 |
| EP | 3277000 A1 | 1/2018 |
| EP | 3402238 A1 | 11/2018 |
| EP | 3277001 B1 | 1/2019 |
| EP | 3335448 B1 | 9/2019 |
| EP | 3643092 A1 | 4/2020 |
| EP | 3672300 A1 | 6/2020 |
| EP | 3681183 A2 | 7/2020 |
| EP | 3714615 A1 | 9/2020 |
| EP | 3777273 A1 | 2/2021 |
| EP | 3644631 B1 | 6/2021 |
| EP | 3923645 A1 | 12/2021 |
| EP | 3437373 B1 | 7/2022 |
| EP | 3721649 B1 | 10/2022 |
| JP | 5925918 B2 | 4/2016 |
| JP | 2016167835 A | 9/2016 |
| JP | 6513539 B2 | 4/2019 |
| JP | WO2019065897 A1 | 8/2020 |
| JP | 2021002793 A | 1/2021 |
| JP | 2021182676 A | 11/2021 |
| KR | 20110081938 A | 7/2011 |
| KR | 101268579 B1 | 5/2013 |
| KR | 101447766 B1 | 10/2014 |
| KR | 101500803 B1 | 3/2015 |
| KR | 101535361 B1 | 7/2015 |
| KR | 102293706 B1 | 8/2021 |
| KR | 20210101658 A | 8/2021 |
| KR | 20210101667 A | 8/2021 |
| KR | 102378301 B1 | 3/2022 |
| KR | 102399737 B1 | 5/2022 |
| KR | 20220097461 A | 7/2022 |
| KR | 102435266 B1 | 8/2022 |
| WO | 2008009227 A1 | 1/2008 |
| WO | 2013023515 A1 | 2/2013 |
| WO | 2017201804 A1 | 11/2017 |
| WO | 2018053903 A1 | 3/2018 |
| WO | 2018065052 A1 | 4/2018 |
| WO | 2018067956 A1 | 4/2018 |
| WO | 2018133271 A1 | 7/2018 |
| WO | 2019018244 A1 | 1/2019 |
| WO | 2019136044 A1 | 7/2019 |
| WO | 2020187261 A1 | 9/2020 |
| WO | 2020253801 A1 | 12/2020 |
| WO | 2021008713 A1 | 1/2021 |
| WO | 2021047561 A1 | 3/2021 |
| WO | 2021057648 A1 | 4/2021 |
| WO | 2021058305 A1 | 4/2021 |
| WO | 2021138511 A1 | 7/2021 |
| WO | 2021160272 A1 | 8/2021 |
| WO | 2021162387 A1 | 8/2021 |
| WO | 2021233159 A1 | 11/2021 |
| WO | 2022001554 A1 | 1/2022 |
| WO | 2022139481 A1 | 6/2022 |
| WO | 2022207164 A1 | 10/2022 |

* cited by examiner

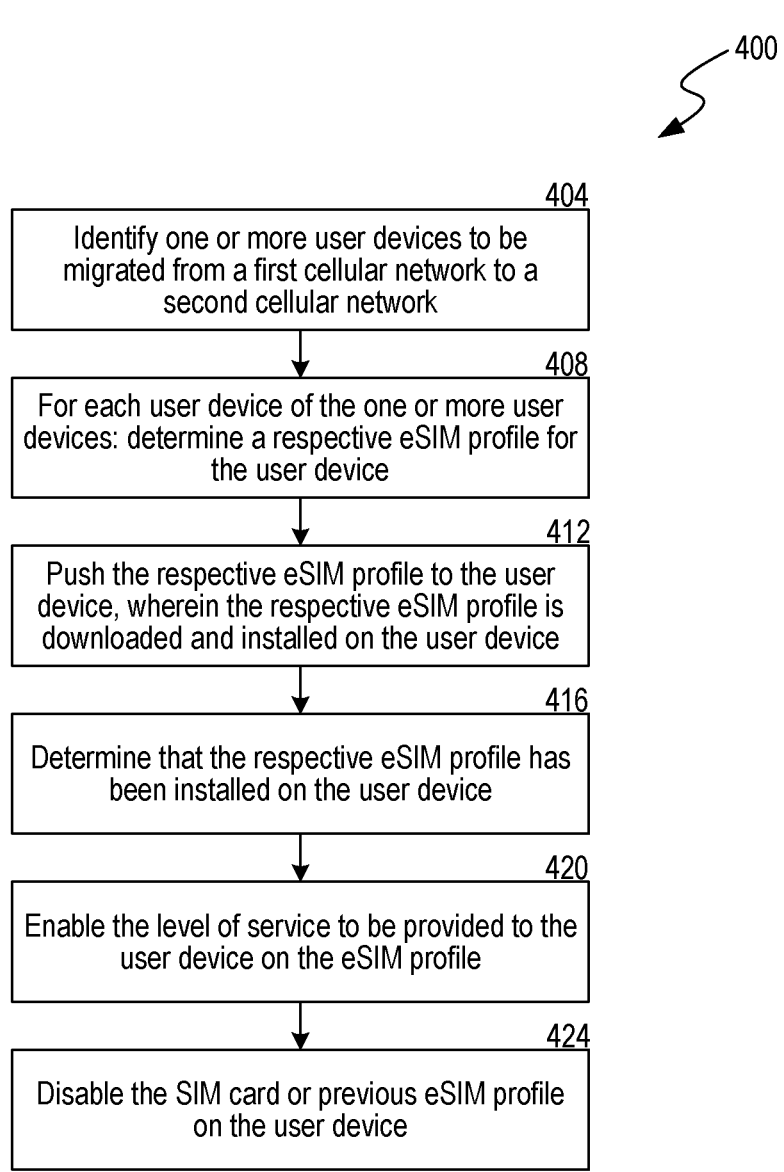

404
Identify one or more user devices to be migrated from a first cellular network to a second cellular network 408
For each user device of the one or more user devices: determine a respective eSIM profile for the user device 412
Push the respective eSIM profile to the user device, wherein the respective eSIM profile is downloaded and installed on the user device 416
Determine that the respective eSIM profile has been installed on the user device 420
Enable the level of service to be provided to the user device on the eSIM profile 424
Disable the SIM card or previous eSIM profile on the user device

*FIG. 4*

PUSHING ESIM FUNCTIONALITY TO USER DEVICES BY CELLULAR NETWORKS

BACKGROUND

Wireless communication networks provide wireless data services to wireless user devices. Exemplary wireless data services include Internet-access, media-streaming, social networking, and machine-control. Exemplary wireless user devices include phones, computers, vehicles, robots, and sensors. Wireless user devices execute user applications to support and use the wireless data services. For example, a phone may execute an Internet access application to communicate with a data network.

Some wireless user devices include subscriber identity module (SIM) cards. A SIM card includes an integrated circuit (IC) that stores an international mobile subscriber identity (IMSI) number and its related key, which are used to identify and authenticate a subscriber on mobile telephony devices (such as mobile phones and computers). Embedded-SIM (eSIM) technology is replacing physical SIM cards in some domains, including cellular telephony. An eSIM is a form of programmable SIM card that is embedded directly into a device. Instead of an integrated circuit located on a removable universal integrated circuit card (UICC), an eSIM includes software installed on a device. Once an eSIM carrier profile has been installed, it operates similarly to a physical SIM, complete with a unique ICCID and network authentication key generated by the carrier.

However, as cellular networks evolve and are capable of providing a wider variety of services and benefits to users, users may not readily be able to swap out their current physical SIM cards or eSIM software. Moreover, when a first network is acquired by or merged with a second network, users of the first network need to be migrated from the first network to the second. Traditional methods that rely on a user to act on initiating the transfer are time consuming. Further, traditional SIM swap methods can require a user to visit a store or call customer care to be able to migrate a device to the second network, increasing the cost of the migration to the user and the network operator.

BRIEF DESCRIPTION OF THE DRAWINGS

Detailed descriptions of implementations of the present technology will be described and explained through the use of the accompanying drawings.

FIG. 4 is a flowchart that illustrates an example process for pushing eSIM functionality to user devices by cellular networks.

Figure 1:
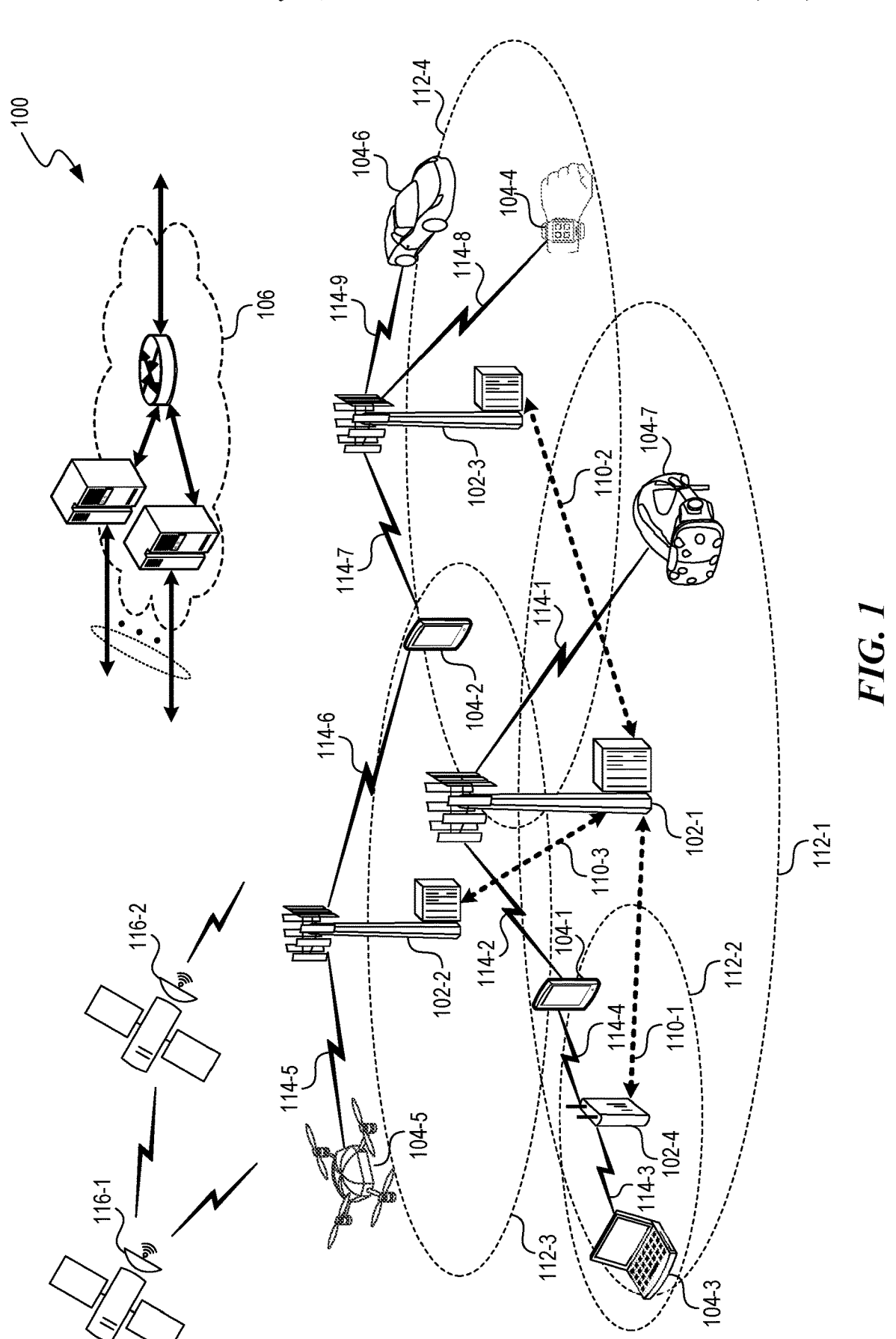
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

An embedded subscriber identity module (SIM) profile, or eSIM profile, refers to programmable SIM software that can be downloaded to and installed on a card that is physically and/or communicatively connected (for example, soldered) to a user device's motherboard. Mobile devices can contain legacy SIM cards or older eSIM profiles that are not compatible with a new state of a cellular network, or that need to be replaced to match an upgraded level of service. Therefore, methods are needed for updating eSIM profiles on devices. Such methods would enable reconfiguring the connectivity of the device as well as migrating between lines, carriers, or networks.

This specification discloses apparatuses, methods, and systems for updating eSIM functionality at user devices (for example, by telecommunications network providers). The user device can be an IoT device, a mobile device, a laptop, etc. The eSIM functionality is pushed to a user device to upgrade the eSIM profile on the user device, switch the user device from operating using a SIM card to operating using eSIM, migrate the user device from a first mobile/cellular network to a second mobile/cellular network, and/or upgrade functionality of the device for providing a different level of service to the user device by a mobile/cellular network.

Using the apparatuses and methods described here, a cellular network can identify one or more user devices to be migrated to another network. For example, to identify the user devices, the cellular network determines that the user devices are eSIM-capable of being upgraded to operate using the other network. To migrate the user devices, the cellular network determines a respective eSIM profile to be installed on each user device. A user device can have a legacy SIM card or a previous eSIM profile installed already that can be disabled. The cellular network pushes the respective eSIM profiles to the user devices to begin the migration. The user devices download and install the respective eSIM profiles for the migration. The respective eSIM profiles are enabled on the user devices, and any legacy SIM cards and previous eSIM profiles are disabled. The user devices can now access the other network and receive service from the other network.

The benefits and advantages of the implementations described herein include providing the evolving cellular network with the capability to push the latest version of eSIM software to mobile devices without impacting service. Swapping out of SIM cards is also obviated. The methods disclosed therefore reduce the time to update the eSIM and cost of updating a SIM card. Further, the methods disclosed herein increase security compared to physical SIM cards because eSIM profiles cannot be removed if a user device is lost or stolen. Using the disclosed apparatuses, users do not need to obtain, carry, or swap physical SIM cards, or wait for them to arrive by mail.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. The wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-toeverything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
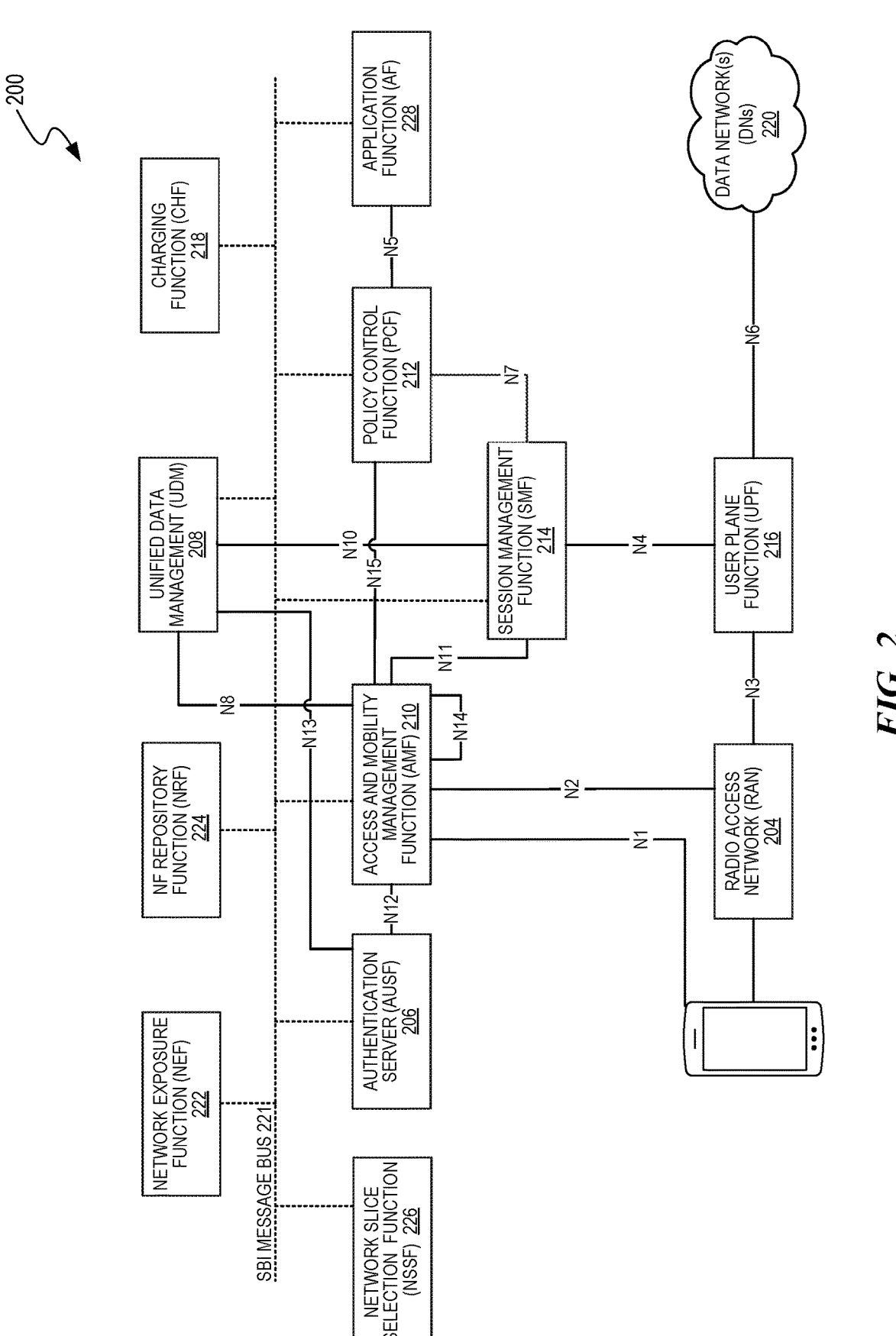
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Pushing eSIM Functionality to Mobile Devices by Cellular Networks

Figure 3:
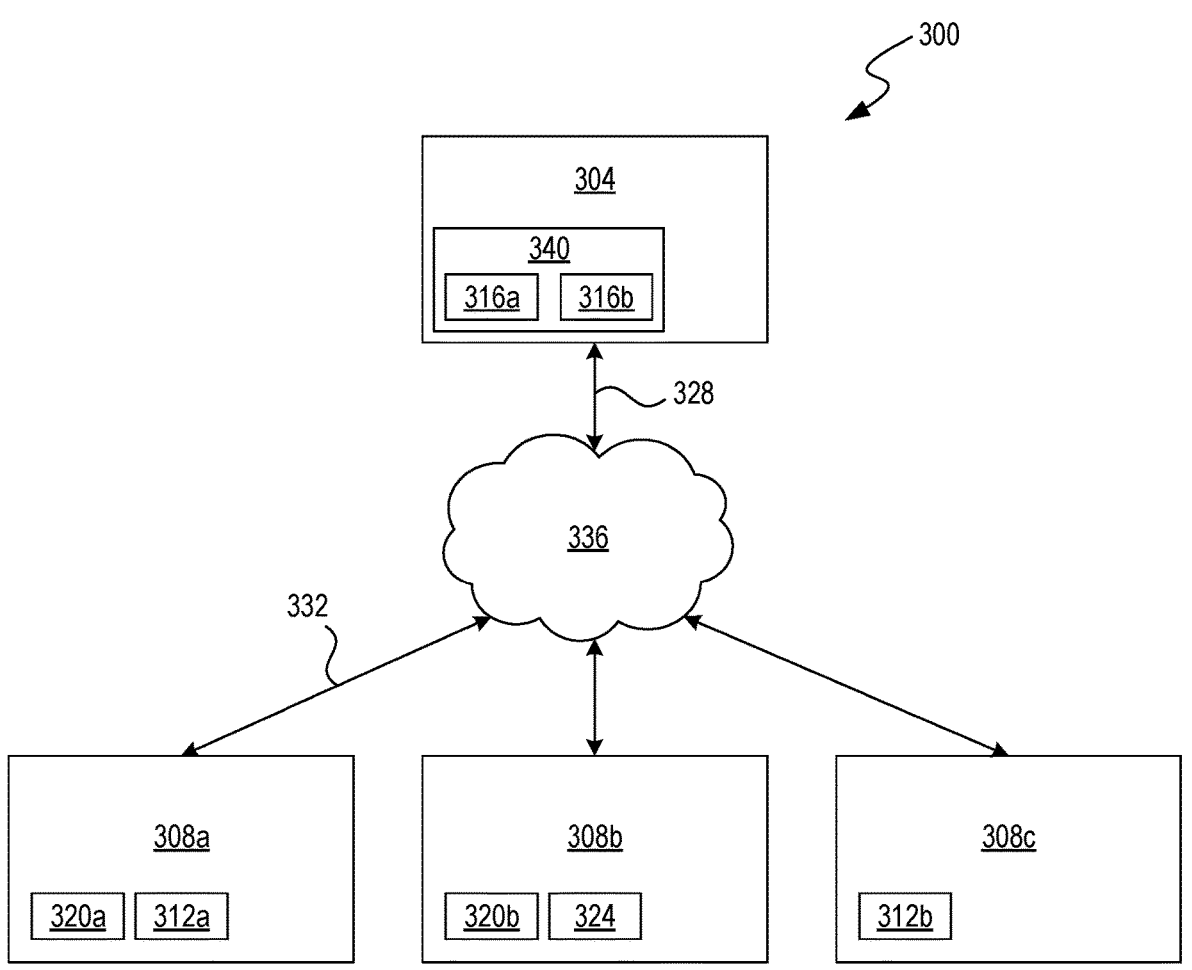
FIG. 3 is a block diagram that illustrates an example system for pushing eSIM functionality to user devices by cellular networks.

FIG. 3 is a block diagram that illustrates an example system 300 for pushing eSIM functionality to user devices by cellular networks. The system 300 shown by FIG. 3 includes system 304, interface 336, and user devices 308a-c. System 304 can be part of a cellular network (e.g., network 100 illustrated and described in more detail with reference to FIG. 1) or system 304 can be a set of standalone servers and/or devices. The system 300 shown by FIG. 3 is implemented using components of the example computer system 500 illustrated and described in more detail with reference to FIG. 5. Likewise, system 300 can include different and/or additional components or can be connected in different ways.

System 304 includes a Subscription Manager-Data Preparation (SM-DP+) 340, and stores eSIM profiles 316a-b that system 304 has generated, determined, or received from another server or communications network. SM-DP+ 340 is a platform that stores digital eSIM profiles. User devices 308a-c are each similar to or the same as device 104 illustrated and described in more detail with reference to FIG. 1. User devices 308a-c can connect to SM-DP+ 340 using Wi-Fi or an eSIM bootstrap profile provided by the original equipment manufacturer (OEM) or mobile network operator (MNO). An MNO (sometimes referred to as a carrier service provider, mobile phone operator, or mobile network carrier) is a telecommunications service provider that enables wireless voice and data communication for mobile devices. System 304 can include different Remote SIM Provisioning (RSP) platform functions that facilitate the remote provisioning of eSIM profiles.

ESIM profiles 316a-b deliver replaceable network access profiles to user devices (e.g., user devices 308a-b). An eSIM profile provides the ability to securely download, attach, enable, and/or disable profiles remotely. An eSIM profile holds a user device's unique identity. It matches a customer's subscription agreement with a specific MNO. An eSIM profile is replaceable, with a new profile provisioned on an embedded Universal Integrated Circuit Card (eUICC) using RSP. Example eUICCs 320a-b are shown by FIG. 3. ESIM profiles can include two category types: an initial activation or "Bootstrap" profile, and one or more operational profiles.

Interface 336 includes one or more communication channels between system 304 and user devices 308a-c. For example, interface 336 can include one or more cellular networks (e.g., when dual SIM or multiple eSIM profiles are used), Wi-Fi, Bluetooth, other short-range or long-range wireless networks, a virtual private network (VPN), a secure tunnel, or a combination thereof. Examples of secure tunnel interfaces (ES9+ interface, ES8+ interface) are described in more detail with reference to FIG. 4. Interface 336 can include any of the network components illustrated and described in more detail with reference to FIGS. 1-2.

User device 308a can be a mobile device or an Internet of Things (IoT) device that is eSIM-capable. An IoT device includes hardware, such as sensors, actuators, gadgets, appliances, or machines, that are programmed for certain applications and can transmit data over the Internet or other networks (e.g., non-3GPP networks). An IoT device can be embedded into a mobile device, industrial equipment, an environmental sensor, a medical device, etc.

User device 308a includes a subscriber identity module (SIM) card 312a and RSP-capable eSIM hardware (eUICC 320a). SIM card 312a is an integrated circuit intended to securely store an international mobile subscriber identity number and its related key, which are used to identify and authenticate subscribers on user device 308a. The eUICC 320a is an embedded card (permanently soldered to user device 308a) according to the architectural standards published by the GSM Association (GSMA) or implementations of those standards for eSIM. The eUICC 320a is an apparatus used to securely store one or more eSIM profiles, which are the unique identifiers and cryptographic keys used by cellular network service providers to uniquely identify and securely connect to mobile network devices. An eUICC can be embedded in mobile network devices (e.g., cell phones, tablets, portable computers, security controllers, or medical devices) that use GSM cellular network eSIM technology.

The eUICC 320a can include a local profile assistant (LPA). The LPA includes multiple functions in user device 308a responsible for providing the capability to download encrypted eSIM profiles to eUICC 320a. The LPA also presents the local management end user interface to the end user so that a user can manage the status of eSIM profiles on eUICC 320a. In an example, the LPA is a software application (e.g., LPA 324) stored in a memory of a user device (e.g., user device 308b). In another example, an LPA is stored in a eUICC (e.g., eUICC 320a) embedded in a user device (e.g., user device 308a). The principal functions of the LPA can also be in-built into eUICC 320a.

User device 308b includes eUICC 320b and an LPA 324 application stored in memory of user device 308b. The eUICC 320b is the same as or similar to eUICC 320a. LPA 324's functions are the same as or similar to the LPA of user device 308a. User device 308c includes SIM card 312b, which is similar to SIM card 312a.

In some implementations, system 304 identifies one or more user devices (e.g., user devices 308a-b) to be migrated from a first cellular network to a second cellular network. The user devices to be migrated can be identified using account details of the user devices from the first cellular network. For example, the account details are stored in a database accessible by system 304. System 304 can be part of the first cellular network, the second cellular network, or a standalone system or server. System 304 can identify a user device to be provided an upgraded level of service on a cellular network, e.g., on the first cellular network. System 304 determines that the user device to be upgraded or migrated is eSIM-capable. For example, identifying the one or more user devices includes determining that the one or more user devices are eSIM-capable of being upgraded to operate using the second cellular network. A cellular network or system 304 can determine whether a user device is eSIM-capable based on the user device's existing network registration information, which references the user device's model information. The user device model indicates whether the user device is eSIM-capable.

For each user device of the one or more user devices 108a-b, system 304 determines a respective eSIM profile for the user device. The eSIM profiles are determined and then stored on a global system for mobile communication (GSM)-standard-based eSIM platform. The eSIM profiles are loaded on to SM-DP+ 340. One or more particular eSIM profiles are selected for downloading to the user devices from SM-DP+ 340. The respective eSIM profiles are capable of being downloaded and installed on user devices 108a-b. In an example, user device 308a has a SIM card 312a or a previous eSIM profile installed on user device 308a. A respective eSIM profile is not determined or generated for user device 108c, which is not eSIM capable (user device 108c has no eUICC). In an example, the respective eSIM profiles determined match an upgraded level of service (e.g., an upgraded cellular plan, a larger monthly data limit, faster network access speeds, or access to greater storage on system 304 by user devices 108a-b) to be provided. System 304 transmits the respective eSIM profiles to user devices 108a-b. For example, eSIM profile 316a is sent to LPA 324 of user device 308b.

The respective eSIM profiles newly determined by system 304 match a new or upgraded level of service to be provided to user devices 108a-b by the second cellular network. System 304 can push the respective eSIM profiles to user devices 108a-b. System 304 includes SM-DP+ 340, which is configured to push the respective eSIM profiles to user devices 108a-b via an encrypted data channel (e.g., interface 336). In an example, system 304 transmits or sends message 328 (e.g., a notification) to user device 308a. Message 328 can include text, IP data packets, XML, hypertext transfer protocol (HTTP), JavaScript object notation (JSON), or a remote procedure call (RPC). The terms "transmit" and "send" are used interchangeably herein. The notification indicates that an update to user device 308a is available.

In some implementations, system 304 pushes a respective eSIM profile to user device 308a in response to receiving corresponding message 332 (e.g., an input from user device 308a). For example, system 304 triggers or notifies user device 308a using an encrypted data channel (e.g., interface 336) or message 328. User device 308a fetches the respective eSIM profile from SMDP+ 340. Message 332 can include text, IP data packets, XML, hypertext transfer protocol (HTTP), JavaScript object notation (JSON), or a remote procedure call (RPC). Sending a respective eSIM profile to user device 108b can be performed in absence of receiving an input from user device 108b, e.g., eSIM profiles can be sent automatically and without user action. For example, sending the respective eSIM profiles to user devices 108a-b is performed via interface 336, which can include an ES9+ interface. ES9+ interfaces are described in more detail with reference to FIG. 4.

A respective eSIM profile can be pulled by an LPA (e.g., LPA 324) of a user device (e.g., user device 308b). For example, a Subscription Manager-Discovery Server (SM-DS) provides a means for SM-DP+ 340 to reach eUICC 320b without knowledge of which network user device 308b is connected to. This feature enables user devices connected using different access networks with different addresses to be updated with new eSIM profiles. The SM-DS enables SM-DP+ 340 to post alerts to a secure noticeboard and for user device 308b to extract those alerts. The alerts notify LPA 324 when a respective eSIM profile (e.g., eSIM profile 316a) is available for download to eUICC 320b. Notifications are sent from SM-DP+ 340 to the SM-DS. User device 108b's LPA 324 polls the SM-DS for notifications when required, supporting a "pull" model. Polling frequency can be determined by a state of eUICC 320b or by a user of user device 308b.

The respective eSIM profile can be pushed to an LPA (e.g., LPA 324) of the user device (e.g., user device 308b). The respective eSIM profile is capable of being downloaded and installed on user device 308b. For example, the LPA is connected to SM-DP+ 340 via interface 336, which can be an ES8+ interface. ES8+ interfaces are described in more detail with reference to FIG. 4.

System 304 determines that the respective eSIM profiles have been installed on user devices 108a-b. In an example, a respective eSIM profile (e.g., eSIM profile 316a) is downloaded and installed on user device 308b by LPA 324. In an example, the respective eSIM profiles are stored in eUICCs 320a-b that are permanently attached to user devices 308a-b, respectively. In some implementations, eSIM-capable user devices 108a-b are identified as "first devices." System 304 identifies a "second user device" 108c as lacking eSIM capability. For example user device 108c has no eUICC. Responsive to determining that the second user device 108c lacks eSIM capability, system 304 triggers migration of second user device 108c.

System 304 enables the new or upgraded level of service to be provided to user devices 108a-b on the respective eSIM profiles. System 304 disables legacy SIM cards (e.g., SIM card 312a) or previous eSIM profiles on the user devices (e.g., stored on eUICCs 320a-b). User device 308a can receive requests (e.g., within message 328) from a cellular network (e.g., a cellular network including server 304). The request indicates that the cellular network has eSIM profile 316a for user device 308a to download from the cellular network. For example, eSIM profile 316a is for migrating user device 308a from the cellular network to a second cellular network.

Responsive to receiving the request, user device 308a downloads eSIM profile 316a from the cellular network. User device 308a installs eSIM profile 316a on eUICC 320a attached to user device 308a. User device 308a transmits message 332 to the cellular network. Message 332 indicates that user device 308a has installed eSIM profile 316a. User device 308a receives, from the cellular network, another message causing eSIM profile 316a to be enabled on user device 308a. User device 308a can receives, from the cellular network, a further message causing a legacy SIM card (e.g., SIM card 312a) or a previous eSIM profile to be disabled on user device 308a.

FIG. 4 is a flowchart that illustrates an example process 400 for pushing eSIM functionality to user devices by cellular networks. Process 400 of FIG. 4 can be performed by a telecommunications network. An example network architecture 200 including 5G core NFs is illustrated and described in more detail with reference to FIG. 2. An example network (e.g., including system 304) that implements pushing eSIM functionality to user devices is illustrated and described in more detail with reference to FIG. 3. Process 400 shown by FIG. 4 can be performed by a computer system, e.g., the example computer system 500 illustrated and described in more detail with reference to FIG. 5. Particular entities, for example, SM-DP+ 340, can perform some or all of the steps of the process in some implementations. SM-DP+ 340 is illustrated and described in more detail with reference to FIG. 3. Likewise, implementations can include different and/or additional steps or can perform the steps in different orders.

At 404, a system (e.g., system 304) identifies one or more user devices to be migrated from a first cellular network to a second cellular network in some examples. In other examples, the system identifies devices to be provided an upgraded level of service on a cellular network. For example, a user device has a first eSIM profile installed and is operating on the first cellular network. The system transmits or sends a second eSIM profile to the device to migrate the device from the first cellular network to the second cellular network. Example user devices 308a-c are illustrated and described in more detail with reference to FIG. 3.

The system can determine whether the identified devices are eSIM-capable. In an example, the user device is an IoT device that is eSIM-capable. In other examples, identifying the one or more user devices includes determining that the one or more user devices are eSIM-capable of being upgraded to operate using the second cellular network. The system performing the migration can be operating as part of the first cellular network, the second cellular network, a different network, or a standalone system or server.

At 408, for each user device of the one or more user devices, the system determines a respective eSIM profile for the user device. For example, the system determines an eSIM profile for the user device, where the eSIM profile matches a planned, upgraded level of service. Example eSIM profiles 316a, 316b are illustrated and described in more detail with reference to FIG. 3. In an example, the user device has a SIM card or a previous eSIM profile installed on the user device. The user device is using the SIM card or previous eSIM profile to access a first level of service or operate on the first cellular network. An example SIM card 312a is illustrated and described in more detail with reference to FIG. 3. In another example, the user device has no SIM card or eSIM profile installed but is eSIM-capable. In another example, the respective eSIM profile determined by the system for the user device matches a level of service to be provided to the user device by the second cellular network.

At 412, the system pushes the respective eSIM profile to the user device. The respective eSIM profile can be pushed to an LPA of the user device. An example LPA 324 is illustrated and described in more detail with reference to FIG. 3. The LPA can be stored on an eUICC (e.g., eUICC

320a) or the LPA can be an application stored in a memory of the user device (e.g., LPA 324 stored in memory of user device 308b).

The respective eSIM profile is capable of being downloaded and installed on the user device. For example, the eSIM profile is downloaded from an SM-DP+ of a cellular network. The eSIM profile can be downloaded by an LPA of the device. For example, the system transmits or sends the eSIM profile to an LPA of the user device. The eSIM profile is to be downloaded and installed on the user device. The system can include an SM-DP+ configured to push the respective eSIM profile to the user device via an encrypted data channel. For example, the LPA is connected to the SM-DP+ of the system via an ES8+ interface. An ES8+ interface is an end-to-end encrypted tunnel between the eUICC and the SM-DP+. In an example, the LPA connects the eUICC to the SM-DP+ over the Internet (e.g. via Wi-Fi) using the ES8+ interface for secure transfer of the eSIM profile. An example interface 336 that can be a ES8+ interface is illustrated and described in more detail with reference to FIG. 3.

The system can transmit or send the respective eSIM profile to the user device automatically (e.g., in absence of receiving an input from the user device). The system can send a notification to the user device. An example message 328 (e.g., a notification) is illustrated and described in more detail with reference to FIG. 3. The notification indicates that an update to the user device is available. The respective eSIM profile is pushed by the system to the user device responsive to the system receiving an input from the user device. An example message 332 (e.g., an input from user device 308a) is illustrated and described in more detail with reference to FIG. 3. The respective eSIM profile is downloaded and installed on the user device by the LPA of the user device.

The system can transmit or send the eSIM profile to the user device via an ES9+ interface. An example interface 336 that can be a ES9+ interface is illustrated and described in more detail with reference to FIG. 3. In an example, the eUICC, LPA on the user device, and the SM-DP+ server in the network communicate with each other. A protocol (interface) is used so that different user devices having different types of eUICCs can be used in combination with different SM-DP+ servers and different mobile network operators. The ES9+ interface provides an encrypted connection that the LPA establishes to the SM-DP+ for downloading a new eSIM profile.

At 416, the system determines that the respective eSIM profile has been installed on the user device. The respective eSIM profile is stored in an eUICC that is permanently attached to the user device. Example eUICCs 320a-b are illustrated and described in more detail with reference to FIG. 3. In some implementations, an LPA is stored in the eUICC (e.g., eUICC 320a) of a user device (e.g., user device 308a). In other implementations, an LPA (e.g., LPA 324) is an app stored on memory of a user device (e.g., user device 308b).

At 420, the system (e.g., system 304) enables the level of service to be provided to a user device (e.g., user device 308a) on the eSIM profile (e.g., eSIM profile 316a). For example, system 304 or user device 308a can automatically enable the eSIM profile after it is installed. Enabling of the eSIM profile is performed similarly to enabling other network services or features, such as short message service (SMS), multimedia message service (MMS), voice, data access, or hotspot capability. In an example, system 304 determines that eSIM profile 316a has been installed on user device 308*a*, and enables the upgraded level of service on eSIM profile 316*a*. Enabling eSIM profile 316*a* on eUICC 320*a* grants user device 308*a* access to the MNO's network. User device 308*a* can receive messages (e.g., message 328) from a first cellular network (e.g., system 304). Message 328 is a request indicating that the first cellular network has eSIM profile 316*a* for user device 308*a* to download from the cellular network. Responsive to receiving the request, user device 308*a* downloads eSIM profile 316*a* from the cellular network. User device 308*a* installs eSIM profile 316*a* on eUICC 320*a* attached to user device 308*a*. User device transmits or sends message 322 to the cellular network indicating that user device 308*a* has installed eSIM profile 316*a*. User device 308*a* receives, from the cellular network, an instruction causing the eSIM profile to be enabled on user device 308*a*. For example, the cellular network is a first cellular network. ESIM profile 316*a* is for migrating user device 308*a* from the first cellular network to a second cellular network.

At 424, the system disables the SIM card or previous eSIM profile on the user device. A cellular setting on the user device can be used to enable/disable the SIM/eSIM. An eSIM profile can also be automatically disabled by a message/notification from the cellular network. For example, user device 308*a* receives, from a cellular network, message 328. Message 328 is an instruction causing SIM card 312*a* or previous eSIM profiles (stored on eUICC 320*a*) to be disabled on user device 308*a*.

Multiple user devices (e.g., user devices 308*a*-*c*) can be present. System 304 transfers an eSIM profile to a "first" user device 308*a*. System 304 determines that a "second" user device 308*c* (different from first user device 308*a*) lacks eSIM capability. Responsive to determining that second user device 308*c* lacks eSIM capability, system 304 triggers migration of second user device 308*c*. In an example, system 304 transmits or sends a message to a server indicating that user device 308*c* should be upgraded to a new user device having eSIM capability, or that a legacy SIM card (e.g., SIM card 312*c*) installed in user device 308*c* should be replaced or upgraded.

Computer System

Figure 5:
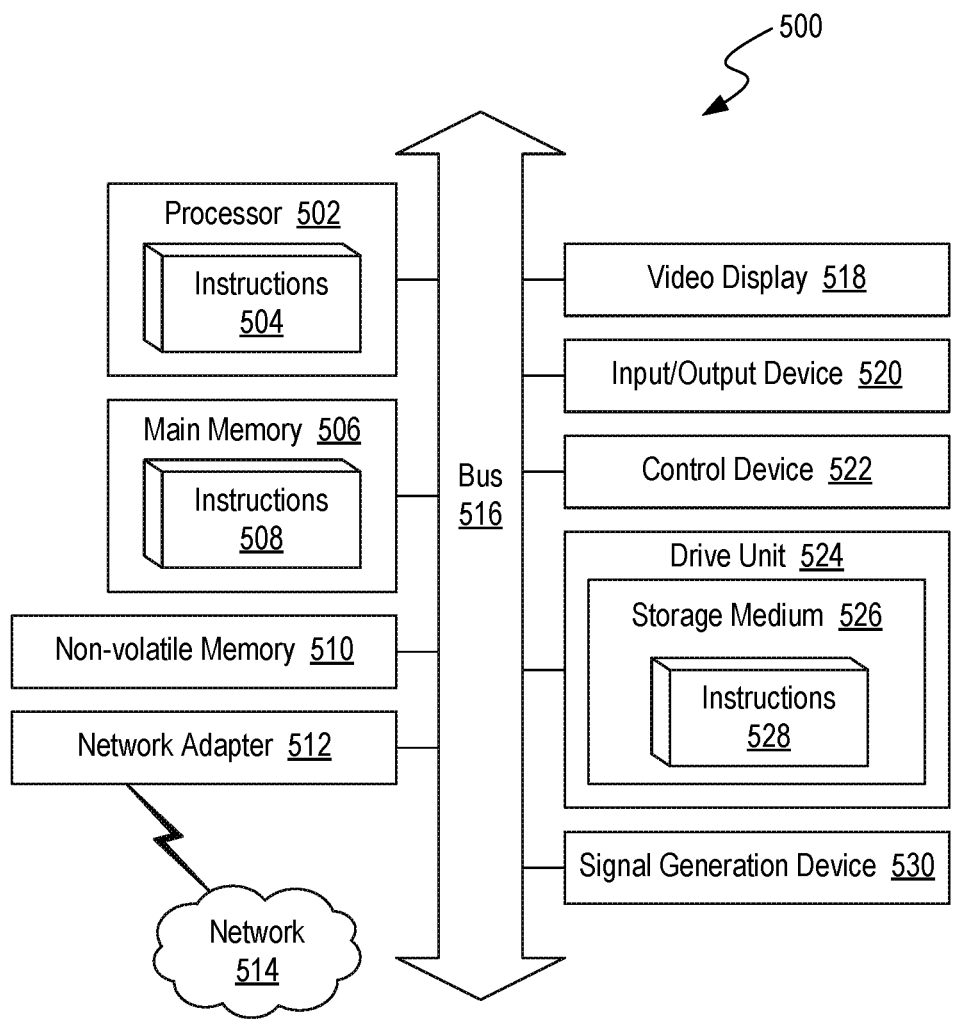
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/ output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system comprising:
   at least one hardware processor; and
   at least one non-transitory memory storing instructions, which, when executed by the at least one hardware processor, cause the system to:
   identify one or more user devices to be migrated from a first cellular network to a second cellular network, wherein identifying the one or more user devices includes determining that the one or more user devices are eSIM-capable of being upgraded to operate using the second cellular network; and
   for each user device of the one or more user devices:
   determine a respective eSIM profile for the user device,
      wherein the user device has a SIM card or a previous eSIM profile installed on the user device, and
      wherein the respective eSIM profile matches a level of service to be provided to the user device by the second cellular network;
   push the respective eSIM profile to the user device,
      wherein the respective eSIM profile is pushed to a local profile assistant (LPA) of the user device, and
      wherein the respective eSIM profile is capable of being downloaded and installed on the user device;
   determine that the respective eSIM profile has been installed on the user device;
   enable the level of service to be provided to the user device on the respective eSIM profile; and
   disable the SIM card or previous eSIM profile on the user device.

2. The system of claim 1, wherein the instructions cause the system to:
   transmit a notification to the user device,
      wherein the notification indicates that an update to the user device is available, and wherein pushing the respective eSIM profile to the user device is performed responsive to receiving an input from the user device.

3. The system of claim 1, wherein the respective eSIM profile is stored in an embedded Universal Integrated Circuit Card (eUICC) permanently attached to the user device.

4. The system of claim 1, wherein the respective eSIM profile is downloaded and installed on the user device by the LPA.

5. The system of claim 1, comprising a Subscription Manager-Data Preparation (SM-DP+) configured to push the respective eSIM profile to the user device via an encrypted data channel.

6. The system of claim 1, wherein the LPA is an application stored in a memory of the user device, or wherein the LPA is stored in a eUICC embedded in the user device.

7. The system of claim 1, wherein the user device is an Internet of things (IoT) device that is eSIM-capable.

8. At least one non-transitory computer-readable storage medium storing instructions, which, when executed by at least one data processor of a system, cause the system to:

identify a first device to be provided an upgraded level of service on a cellular network;

determine that the first device is eSIM-capable;

determine an eSIM profile for the first device, wherein the eSIM profile matches the upgraded level of service;

transmit the eSIM profile to the first device, wherein the eSIM profile is sent to a local profile assistant (LPA) of the first device, and wherein the eSIM profile is capable of being downloaded and installed on the first device;

determine that the eSIM profile has been installed on the first device;

enable the upgraded level of service on the eSIM profile;

determine that a second device, different from the first device, lacks eSIM capability; and responsive to determining that the second device lacks eSIM capability, trigger migration of the second device.

9. The non-transitory computer-readable storage medium of claim 8, wherein transmitting the eSIM profile to the first device is performed in absence of receiving an input from the first device.

10. The non-transitory computer-readable storage medium of claim 8, wherein transmitting the eSIM profile to the first device is performed via a ES9+ interface.

11. The non-transitory computer-readable storage medium of claim 8, wherein the LPA of the first device is connected to a Subscription Manager-Data Preparation (SM-DP+) of the system via an ES8+ interface.

12. The non-transitory computer-readable storage medium of claim 8, wherein the first device has a SIM card or a previous eSIM profile installed, and wherein the instructions cause the system to:

disable the SIM card or previous eSIM profile on the first device.

13. The non-transitory computer-readable storage medium of claim 8, wherein the eSIM profile is a first eSIM profile, wherein the cellular network is a first cellular network, and wherein the instructions cause the system to:

transmit a second eSIM profile to the first device to migrate the device from the first cellular network to the second cellular network.

14. A method comprising:

identifying one or more user devices to be migrated from a first cellular network to a second cellular network, wherein identifying the one or more user devices includes determining that the one or more user devices are eSIM-capable of being upgraded to operate using the second cellular network; and for each user device of the one or more user devices:

determining a respective eSIM profile for the user device, wherein the user device has a SIM card or a previous eSIM profile installed on the user device, and wherein the respective eSIM profile matches a level of service to be provided to the user device by the second cellular network;

pushing the respective eSIM profile to the user device, wherein the respective eSIM profile is pushed to a local profile assistant (LPA) of the user device, and wherein the respective eSIM profile is capable of being downloaded and installed on the user device;

determining that the respective eSIM profile has been installed on the user device;

enabling the level of service to be provided to the user device on the respective eSIM profile; and disabling the SIM card or previous eSIM profile on the user device.

15. The method of claim 14, the method further comprising:

transmitting a notification to the user device, wherein the notification indicates that an update to the user device is available, and wherein pushing the respective eSIM profile to the user device is performed responsive to receiving an input from the user device.

16. The method of claim 14, wherein the respective eSIM profile is stored in an embedded Universal Integrated Circuit Card (eUICC) permanently attached to the user device.

17. The method of claim 14, wherein the respective eSIM profile is downloaded and installed on the user device by the LPA.

18. The method of claim 14, wherein a Subscription Manager-Data Preparation (SM-DP+) configured to push the respective eSIM profile to the user device via an encrypted data channel.

19. The method of claim 14, wherein the LPA is an application stored in a memory of the user device, or wherein the LPA is stored in a eUICC embedded in the user device.

20. The method of claim 14, wherein the user device is an Internet of things (IoT) device that is eSIM-capable.

* * * * *